(12) United States Patent
Lee et al.

(10) Patent No.: US 9,098,245 B2
(45) Date of Patent: Aug. 4, 2015

(54) PORTABLE ELECTRONIC DEVICE

(71) Applicant: Wistron Corporation, New Taipei (TW)

(72) Inventors: Ming-Hsi Lee, New Taipei (TW); Chia-Chi Chang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 143 days.

(21) Appl. No.: 14/066,137

(22) Filed: Oct. 29, 2013

(65) Prior Publication Data

US 2014/0347812 A1  Nov. 27, 2014

(30) Foreign Application Priority Data

May 23, 2013 (TW) .............................. 102118296 A (51) Int. Cl.
*G06F 1/16* (2006.01)
*H05K 5/00* (2006.01)
*H05K 7/00* (2006.01)

(52) U.S. Cl.
CPC .................................... *G06F 1/1679* (2013.01)

(58) Field of Classification Search
CPC ... G06F 1/1616; G06F 1/1662; G06F 1/1656; G06F 1/1669; G06F 1/1626; G06F 1/1679; G06F 1/1681
See application file for complete search history.

(56) References Cited

U.S. PATENT DOCUMENTS

| | | | | |
|---|---|---|---|---|
| 4,387,623 A * | 6/1983 | Kimble | ............................ | 84/179 |
| 5,107,402 A * | 4/1992 | Malgouires | .............. | 361/679.17 |
| 5,375,076 A * | 12/1994 | Goodrich et al. | ........ | 361/679.17 |
| 5,510,953 A * | 4/1996 | Merkel | ..................... | 361/679.08 |
| 6,480,373 B1 * | 11/2002 | Landry et al. | ............. | 361/679.06 |
| 6,700,774 B2 * | 3/2004 | Chien et al. | ................ | 361/679.2 |
| 6,768,635 B2 * | 7/2004 | Lai et al. | .................. | 361/679.11 |
| 7,545,631 B2 * | 6/2009 | Chen | ......................... | 361/679.55 |
| 8,023,254 B2 * | 9/2011 | Zhou | ......................... | 361/679.17 |
| 8,081,429 B2 * | 12/2011 | Horie | ........................ | 361/679.02 |
| 8,089,758 B2 * | 1/2012 | Zhu et al. | ................. | 361/679.58 |
| 8,284,543 B2 * | 10/2012 | Wang | ........................ | 361/679.01 |
| 8,451,595 B2 * | 5/2013 | Leung et al. | ............. | 361/679.13 |
| 2002/0048155 A1 * | 4/2002 | Chiang et al. | ................ | 361/747 |
| 2002/0085338 A1 * | 7/2002 | Lin | ............................... | 361/680 |
| 2003/0021082 A1 * | 1/2003 | Lu et al. | ........................ | 361/683 |

(Continued)

FOREIGN PATENT DOCUMENTS

TW            M256963          2/2005

*Primary Examiner* — Hoa C Nguyen
*Assistant Examiner* — Xanthia C Cunningham
(74) *Attorney, Agent, or Firm* — Muncy, Geissler, Olds & Lowe, P.C.

(57) ABSTRACT

An electronic device having a main body, an expanded element, a support element, and a latch device is disclosed. The main body has a first surface and a second surface, wherein the second surface has a first accommodating slot and a second accommodating slot. The expanded element detachably connects to the first accommodating slot and the expanded element has at least one expanded function. The support element is accommodated in the second accommodating slot and has a folded state and a support state. The latch device having a first latch element for engaging with the expanded element and a second latch element for engaging with the support element is movably connecting to the main body. When the latch device moves to a first position, the engagement with the expanded element is released. When the latch device moves to a second position, the engagement with the support element is released.

13 Claims, 12 Drawing Sheets

(56) References Cited

U.S. PATENT DOCUMENTS

| | | | |
|---|---|---|---|
| 2003/0021086 A1* | 1/2003 | Landry et al. | 361/683 |
| 2004/0160738 A1* | 8/2004 | Chen et al. | 361/683 |
| 2004/0190239 A1* | 9/2004 | Weng et al. | 361/683 |
| 2005/0052831 A1* | 3/2005 | Chen | 361/680 |
| 2006/0028791 A1* | 2/2006 | Huang et al. | 361/683 |
| 2006/0126281 A1* | 6/2006 | Kwon | 361/681 |
| 2007/0201194 A1* | 8/2007 | Chen et al. | 361/680 |
| 2008/0259537 A1* | 10/2008 | Arisaka et al. | 361/680 |
| 2010/0039761 A1* | 2/2010 | Wang | 361/679.17 |
| 2010/0271771 A1* | 10/2010 | Wu et al. | 361/679.17 |
| 2010/0277858 A1* | 11/2010 | Zhou | 361/679.17 |
| 2013/0021735 A1* | 1/2013 | Pu et al. | 361/679.17 |
| 2013/0257733 A1* | 10/2013 | Moore et al. | 345/168 |

* cited by examiner

PORTABLE ELECTRONIC DEVICE

BACKGROUND OF THE INVENTION

1. Field of the Invention

The invention relates to a portable electronic device, particular to a portable electronic device capable of integrating devices with different expanded functions to be engaged or released into a single latch device.

2. Description of the Related Art

With the advance of technology, portable electronic devices such as tablet or notebook computers have been widely used, wherein tablet computers are light, compact and easy to operate, which make them the fast growing portable electronic devices. However, since a tablet computer is lightweight and uses a touch screen as its major input device, such tablet computer is usually not equipped with a keyboard, which may cause inconvenience for users who are used to keyboard input. Although there are a variety of commercially available expandable keyboard docks that can be connected to the tablet computer, they are usually designed to be separated with the tablet computer and combined with an external device when needed and are not easy to carry.

In addition, for the use of tablet computer that can stand in a certain angle on a table plane, the tablet computer is usually designed and provided with a keyboard dock connected with the tablet computer by a fixed inclined angle, or provided with a support stand in the back side of the tablet computer to be rotated out when necessary to support the tablet computer. As to the existing technology, it has now appeared that a tablet computer is simultaneously provided with two expanded devices including a keyboard module and a support bracket. For example, in Taiwan Patent No. TW M256963, the disassembly of a keyboard module in a tablet computer is controlled using a buckling element, and a support bracket is pivotally connected to two sides of the tablet computer directly. To use the keyboard capability, the buckling element needs to be driven to make the keyboard module depart from the tablet computer. To obliquely erect the tablet computer, a holder needs to be manually pulled out to be used as a stand. This design not only makes the keyboard module and the holder operate independently such that the functions cannot be integrated, and the holder is not provided with an appropriate securing structure and easy to be accidentally pulled to open, which needs to be improved.

SUMMARY OF THE INVENTION

An objective of the invention is to provide a portable electronic device capable of integrating devices with different expanded functions to be engaged or released into a single latch device.

To achieve the objective described above, the portable electronic device of the invention comprises a main body, an expanded element, a support device, and a latch device. The main body comprises a first surface and a second surface opposite to the first surface, wherein the second surface comprises a first accommodating slot and a second accommodating slot. The expanded element is detachable accommodated in the first accommodating slot and has at least an expanded function. The support device is accommodated in the second accommodating slot and can move with respect to the main body in an accommodating state and a support state. The latch device is movably disposed in the main body and comprises a first latch element for engaging with the expanded element and a second latch element for engaging with the support device. When the latch device moves to a first position, the engagement of the first latch element with the expanded element is released. When the latch device moves to a second position, the engagement of the second latch element with the support device is released such that the support device is movable and changed from the accommodating state to the support state in support of the main body.

According to an embodiment of the invention, when the latch device moves to the first position, the engagement of the first latch element with the expanded element is released, the expanded element can be separated with respect to the main body.

According to an embodiment of the invention, when the latch device moves to the second position, the engagement of the second latch element with the support device is released, the support device can be moved and changed from the accommodating state to the support state.

According to an embodiment of the invention, the main body has a first battery. The expanded functions of the expanded element comprise one of a keyboard and a second battery or both.

According to an embodiment of the invention, the expanded element comprises an engaging groove, the first latch element comprises a first fitting hook for correspondingly engaging with an engaging groove, wherein when the first latch element of the latch device moves to the first position, the engagement of the first fitting hook with the engaging groove is released, such that the expanded element is separated with respect to the main body.

According to an embodiment of the invention, the latch device further comprises a driving element disposed in the first latch element and exposed to the main body. The driving element is moved together with the first latch element. That is, driving the driving element can make the first latch element move to the first position and second position.

According to an embodiment of the invention, the first latch element comprises a groove. The driving element comprises a roulette and a guide post, wherein the roulette is exposed to the main body, and the guide post is disposed under the roulette in the groove. When the roulette is driven to move toward a first direction, the first latch element is driven by the guide post to move to the first position, such that the engagement of the first fitting hook with the engaging groove is released and the expanded element is separated with respect to the main body.

According to an embodiment of the invention, the first latch element comprises an acting end. The second latch element is provided with a contact incline disposed corresponding to the acting end. When the first latch element moves to the second position, the acting end contacts and pushes the contact incline to move the second latch element, such that the engagement of the second latch element with the support device is released and the support device is in the support state.

According to an embodiment of the invention, when the driving element is driven to move toward a second direction, the first latch element is driven by the guide post to move to the second position, such that the engagement of the second latch element with the support device is released and the support device is in the support state.

According to an embodiment of the invention, the second latch element comprises a second fitting hook, and the support device comprises a third fitting hook. When the support device is in the accommodating state with respect to the main body, the second fitting hook is engaged with the third fitting hook.

According to an embodiment of the invention, the second latch element comprises an elastic element with elasticity by which the second latch element can normally maintain in a position where the second fitting hook is engaged with the third fitting hook.

According to an embodiment of the invention, the support device comprises a pivot, a support element, and a torsion spring, wherein the pivot is disposed in one end of the support element and the torsion spring is sleeved on the pivot. When the first latch element moves to the second position, the engagement of the second fitting hook with the third fitting hook is released, and the opposite end of the support element departs from the second accommodating slot through the elasticity of the torsion spring.

According to an embodiment of the invention, the first latch element and second latch element are combined and formed integrally.

DETAILED DESCRIPTION OF THE PREFERRED EMBODIMENT

The aforementioned and other objectives, characteristics, and merits of the present invention will become more apparent from the following detailed description of embodiments with the accompanying drawings.

Figure 1:
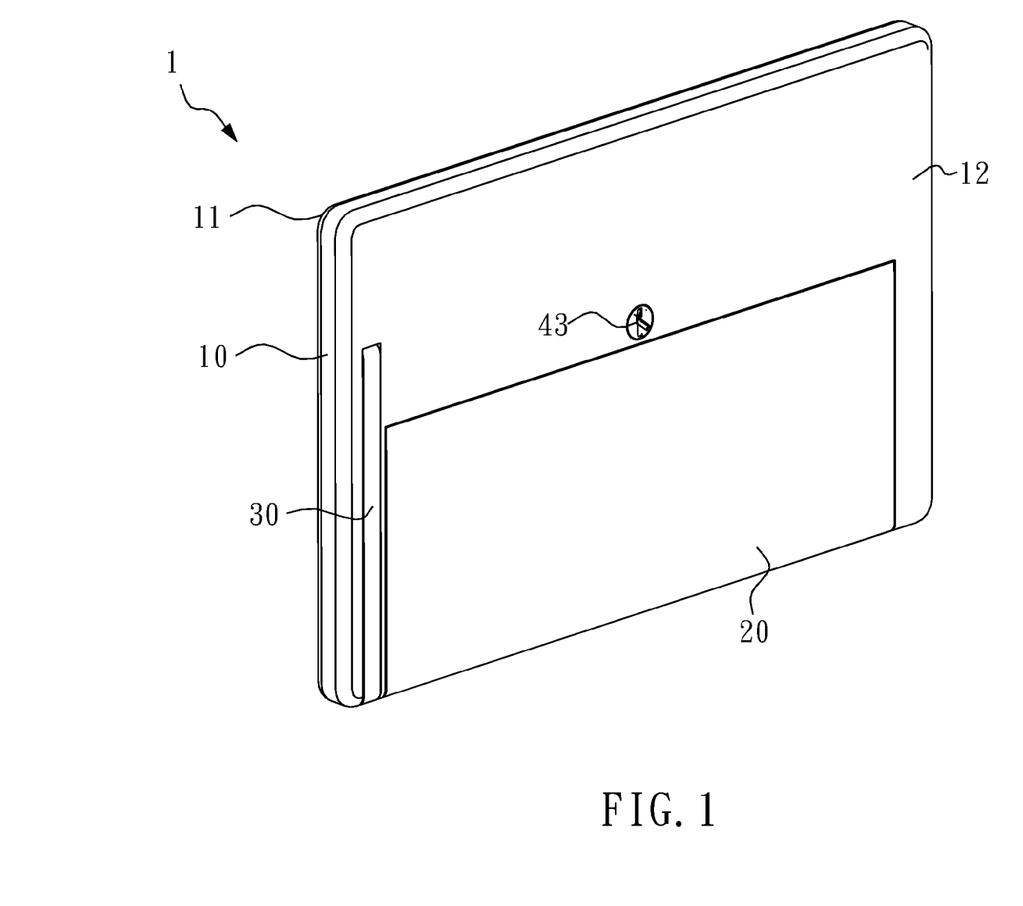
FIG. 1 is a view showing a portable electronic device in the invention.
Figure 2:
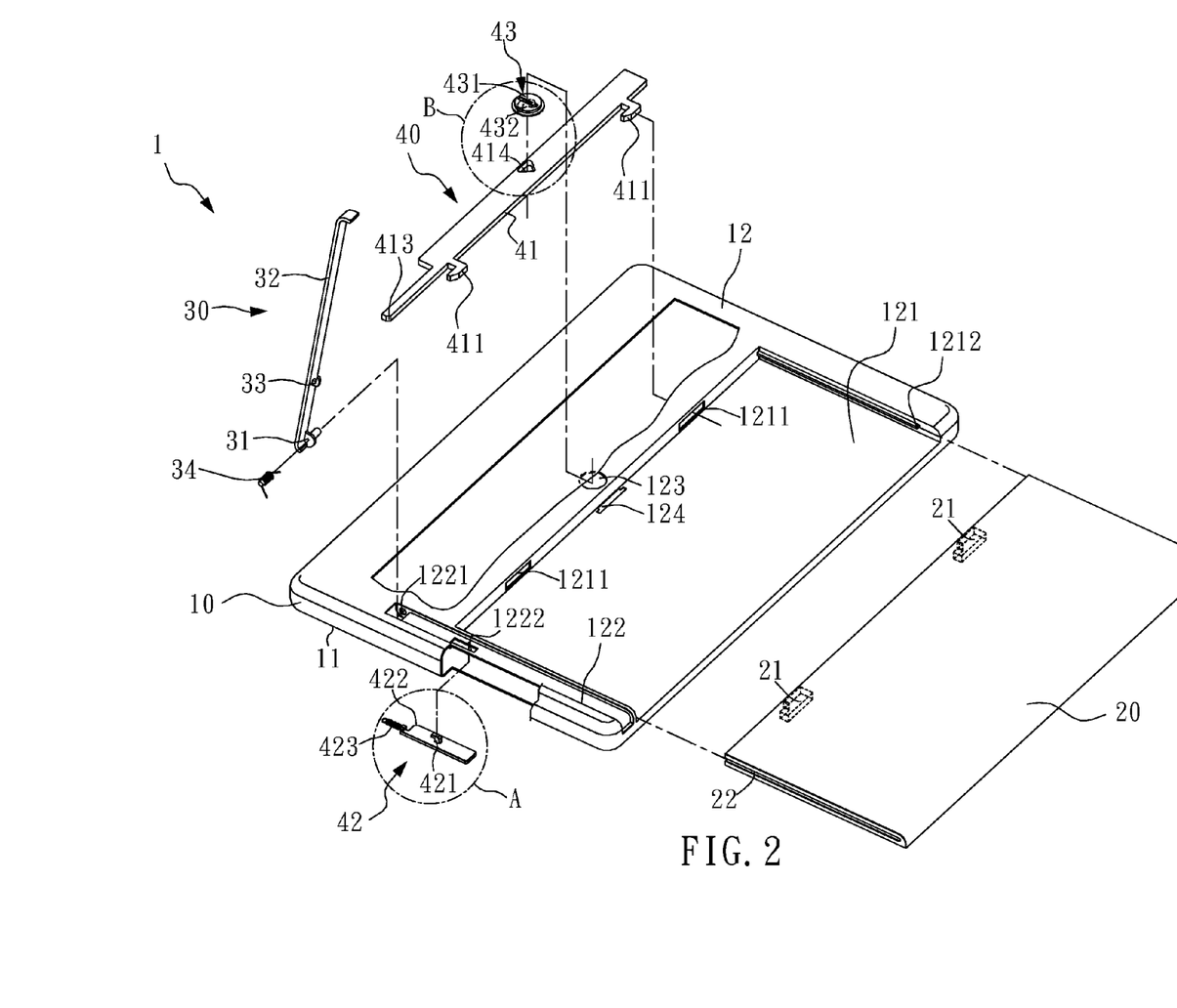
FIG. 2 is an exploded view showing the structure of the portable electronic device according to an embodiment of the invention.
Figure 2A:
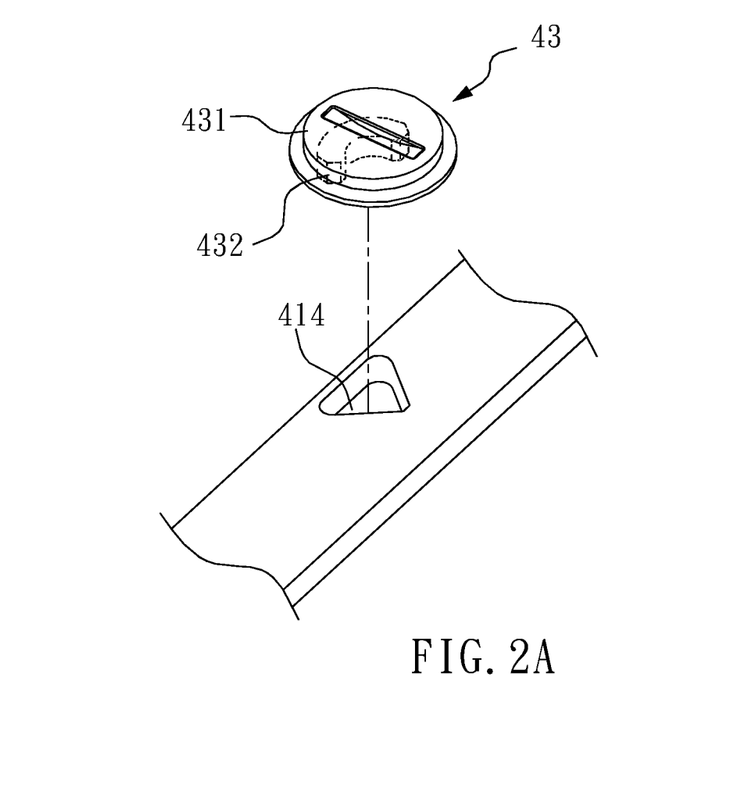
FIG. 2A is an enlarged view of section A in FIG. 2.
Figure 2B:
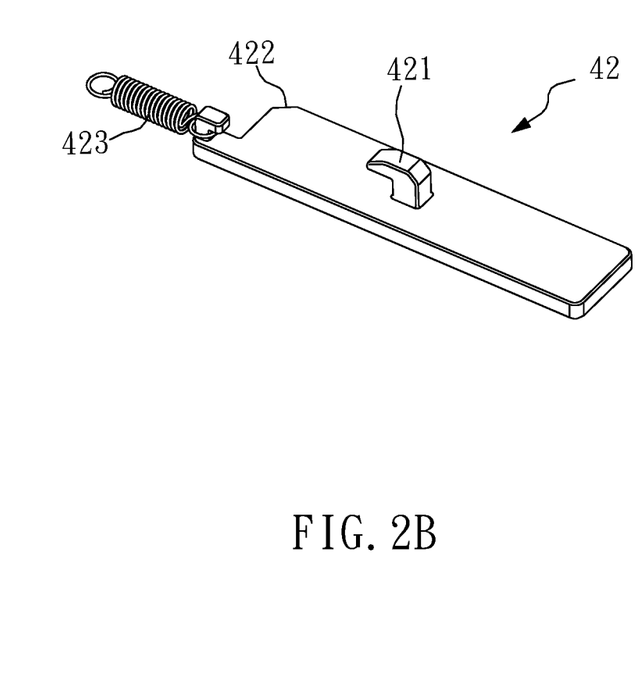
FIG. 2B is an enlarged view of section B in FIG. 2.
Figure 3:
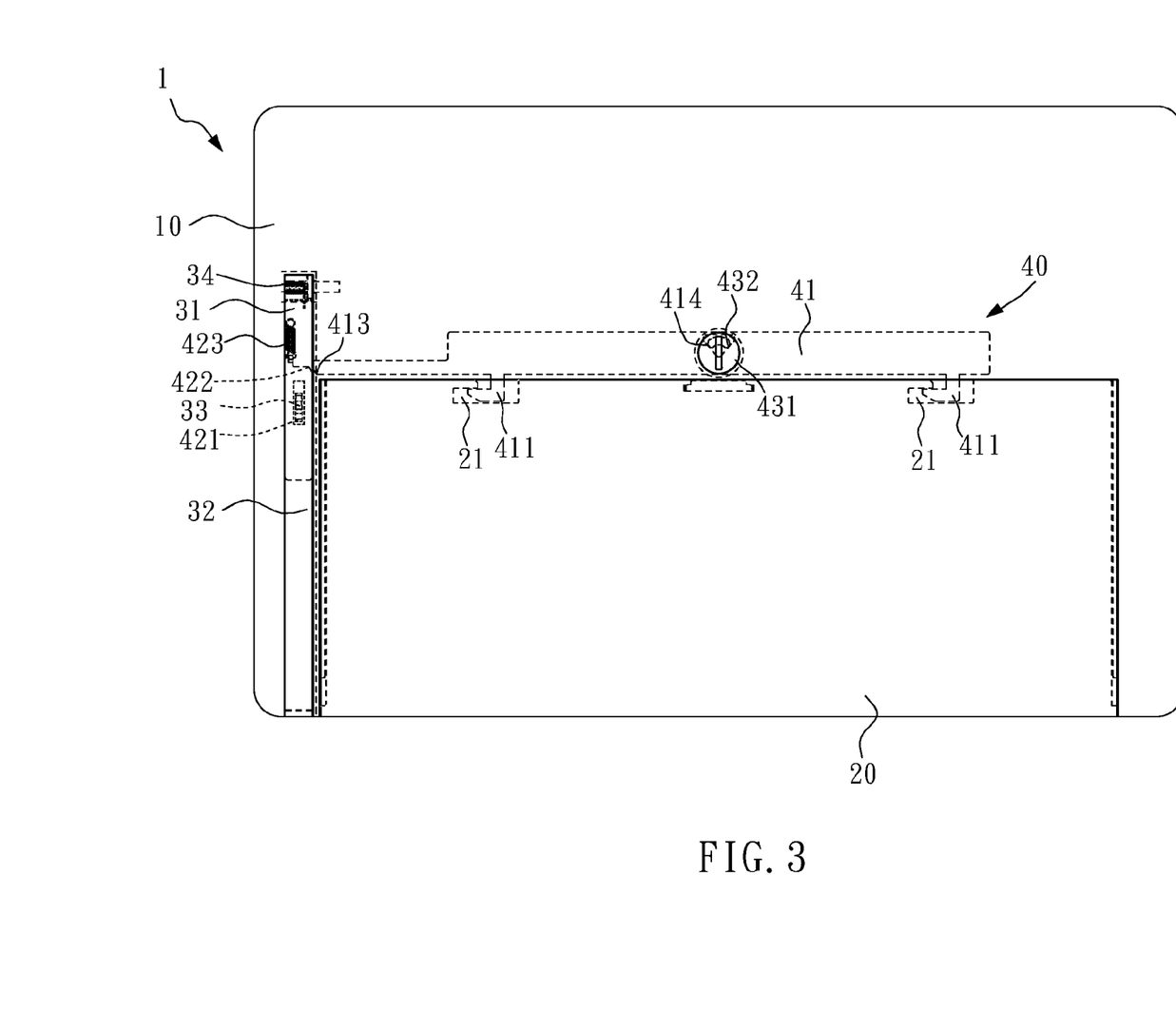
FIG. 3 is a view showing a second surface of the portable electronic device according to an embodiment of the invention.

Hereinafter please refer to FIG. 1 to 3 for a portable electronic device in an embodiment of the invention, wherein FIG. 1 is a view showing a portable electronic device in the invention; FIG. 2 is an exploded view showing the structure of the portable electronic device according to an embodiment of the invention; FIG. 2A is an enlarged view of section A in FIG. 2; FIG. 2B is an enlarged view of section B in FIG. 2; and FIG. 3 is a view showing a second surface of the portable electronic device according to an embodiment of the invention.

As shown in FIGS. 1 and 2, according to an embodiment of the invention, the portable electronic device 1 in the invention comprises a main body 10, an expanded element 20, a support device 30, and a latch device 40. The main body 10 comprises a first surface 11 and a second surface 12 opposite to the first surface 11, wherein the second surface 12 comprises a first accommodating slot 121, a second accommodating slot 122, and a third accommodating slot 123. The expanded element 20 is detachably accommodated in the first accommodating slot 121; the support device 30 is accommodated in the second accommodating slot 122. One end of the support device 30 is pivoted with the main body 10 and can operate in an accommodating state or a support state with respect to the main body 10. The latch device 40 is movably disposed at the main body 10 adjacent to the expanded element 20 and the support device 30.

In the present embodiment, the portable electronic device 1 of the invention is a tablet computer. The first surface 11 is provided with a display screen with touch input capability for receiving user's touch operation. The first accommodating slot 121 of the second surface 12 comprises a first through hole 1211 and a slide guide structure 1212; the second accommodating slot 122 comprises a pivoting hole 1221 and a second through hole 1222.

As shown in FIG. 2, the expanded element 20 comprises an engaging groove 21 and a guide groove 22, wherein the guide groove 22 is disposed corresponding to the slide guide structure 1212, such that the expanded element 20 can get into or out of the first accommodating slot 121 guided by the slide guide structure 1212. It is noted that the expanded element 20 of the invention needs to have at least one expanded function. For example, the portable electronic device 1 is provided with a physical keyboard, an extended battery or both thereof, wherein when the expanded element 20 comprises a battery module, a connecting device (124 in FIG. 2) for connecting with the battery module needs to be provided in one side of the first accommodating slot 121 of the main body 10. However, according to a preferred embodiment of the invention, the portable electronic device 1 is in-built with a first battery module (not shown), and the expanded element 20 is a second battery module on which a keyboard is mounted on one side thereof. Or it can be said equally that the expanded element 20 can be a keyboard with a second battery inside, which are all within the scope of the claims in the invention.

Figure 7:
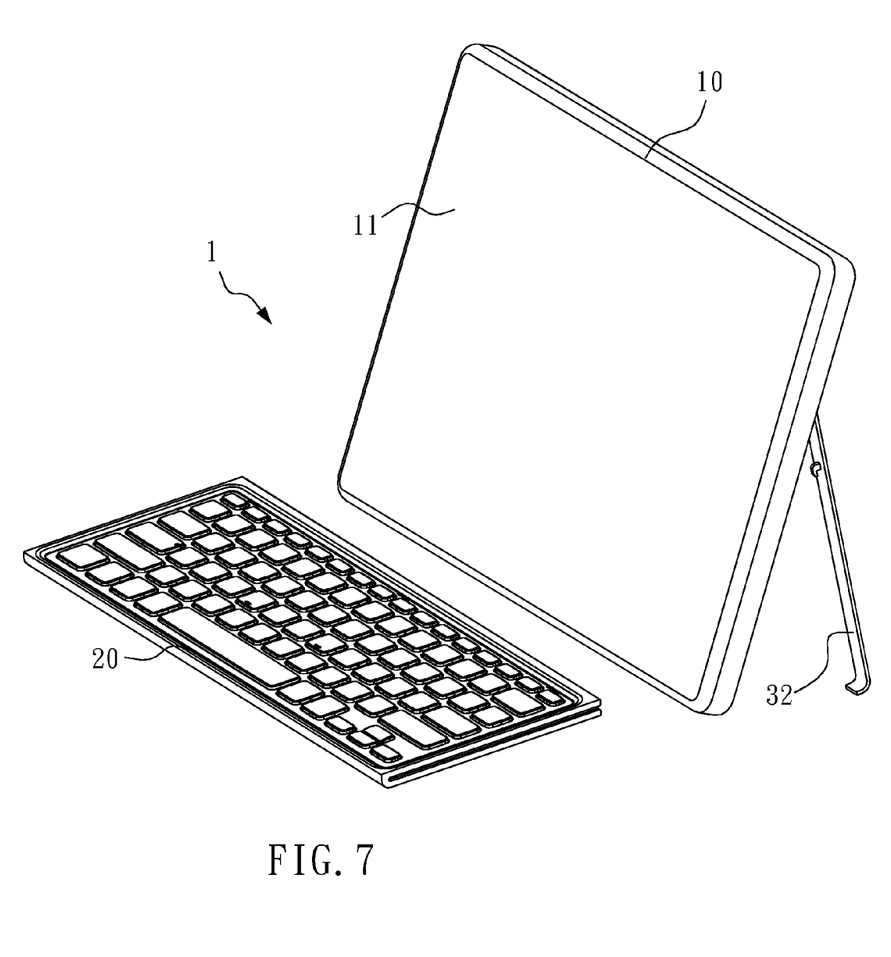
FIG. 7 is a view showing the using state of the portable electronic device in the invention.

According to an embodiment of the invention, the support device 30 comprises a pivot 31, a support element 32, a third fitting hook 33, and a torsion spring 34, wherein the pivot 31 is disposed in one end of the support element 32 and the torsion spring 34 is sleeved on the pivot 31. As shown in FIG. 2, the pivot 31 of the support device 30 passes through the pivoting hole 1221 of the second accommodating slot 122 and is pivotally connected with the main body 10, such that the support device 30 can rotate relative to the main body 10 and operate in the accommodating state and support state. As shown in FIG. 1, when the support device 30 is in the accommodating state with respect to the main body 10, the support device 30 can be accommodated in the second accommodating slot 122; when the support device 30 is in the support state with respect to the main body 10, the support element 32 of the support device 30 is detached from the second accommodating slot 122, as shown in FIG. 7.

Please return to FIG. 2, where the latch device 40 comprises a first latch element 41 for engaging with the expanded element 20, a second latch element 42 for engaging with the support device 30, and a driving element 43, wherein when the latch device 40 moves to a first position, the engagement of the first latch element 41 with the expanded element 20 is released; when the latch device 40 moves to a second position, the engagement of the second latch element 42 with the support device 30 is released. The detailed operation of the latch device 40 and each of its component structure are described in detail hereinafter.

According to an embodiment of the invention, the first latch element 41 comprises a first fitting hook 411, acting end 413, and a groove 414, wherein the first fitting hook 411 passes through the first through hole 1211 to be engaged with the engaging groove 21 of the expanded element 20; therefore, the expanded element 20 is fixed at the first accommodating slot 121.

As shown in FIGS. 2 and 2B, the second latch element 42 comprises a second fitting hook 421, a contact incline 422, and an elastic element 423. When the support device 30 is accommodated in the second accommodating slot 122, the second fitting hook 421 passes through the second through hole 1222 to be engaged with the third fitting hook 33. The contact incline 422 of the second latch element 42 is disposed corresponding to the acting end 413 of the first latch element 41, by which the second latch element 42 provides the moving-together effect through the push and contact by the contact incline 422 with the acting end 413. Through the elasticity of the elastic element 423, the second latch element 42 can normally maintain in a position where the second fitting hook 421 is engaged with the third fitting hook 33, and the second latch element 42 can move when the acting end 413 of the first latch element 41 pushes and contacts the contact incline 422, such that the engagement of the second fitting hook 421 is released with respect to the third fitting hook 33.

In the present embodiment, the driving element 43 is moved together with the first latch element 41. That is, driving the driving element 43 makes the first latch element 41 move to the first position and the second position. As shown in FIG. 2A, the driving element 43 in the embodiment comprises a roulette 431 and a guide post 432, wherein the driving element 43 is accommodated in the third accommodating slot 123 of the main body 10, and the roulette 432 is exposed to the main body 10 for the user to drive the roulette 432. The guide post 432 of the driving element 43 extends into the groove 414 of the first latch element 41. Accordingly, when the roulette 432 is rotated, the guide post 432 pushes and contacts different sides of the groove 414, such that the first latch element 41 can be driven to move toward different directions. In this embodiment, the guide post 432 is arc-shaped, and the groove 414 is triangular-shaped, but the invention is not limited to this.

Hereinafter please refer to FIG. 4, which is a view showing the portable electronic device in an embodiment of the invention withdrawing from the expanded element 20.

Figure 4:
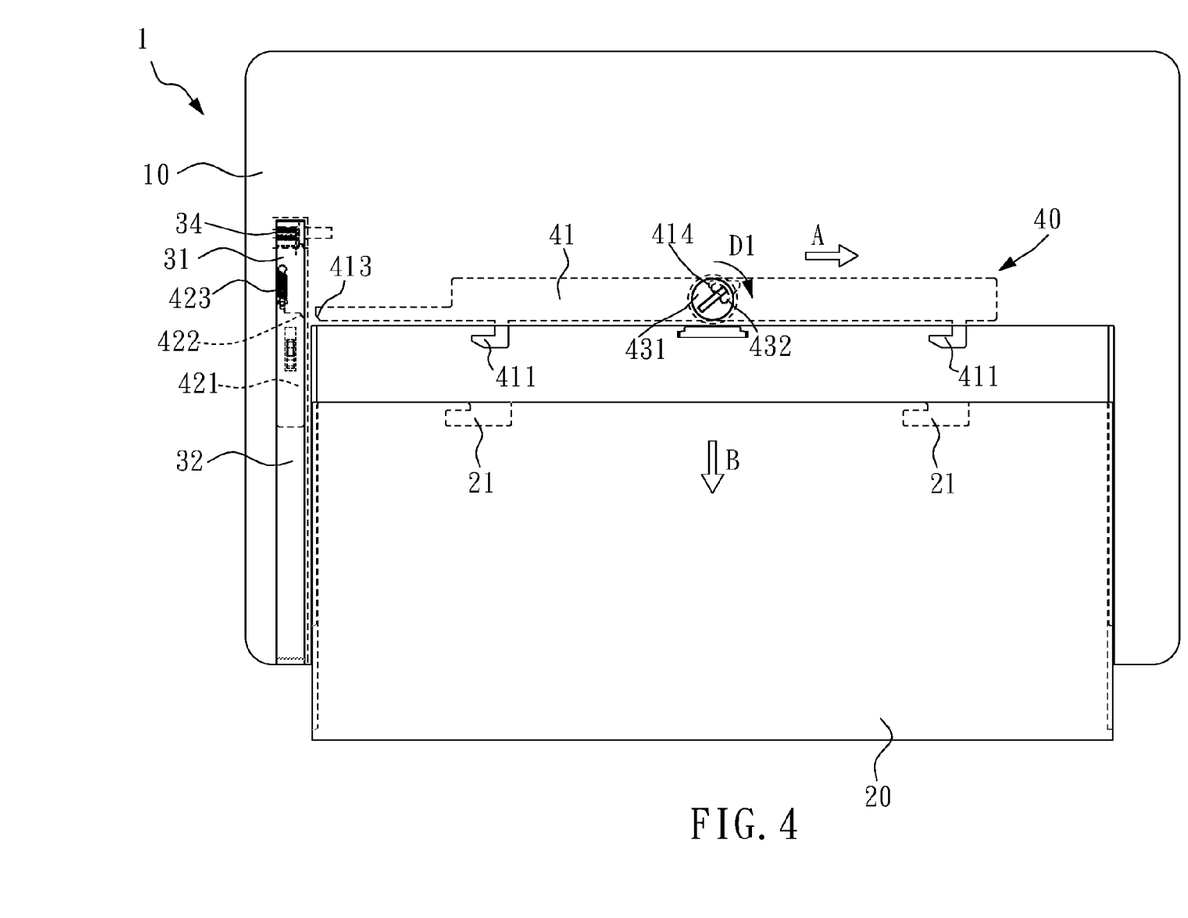
FIG. 4 is a view showing the portable electronic device withdrawing from a first expanded element according to an embodiment of the invention.

In the present embodiment, as shown in FIG. 4, when the roulette 432 is driven to move toward a first direction D1 (in a clockwise direction), the first latch element 41 is driven by the guide post 432 to move transversely from left to right (the direction shown by arrow A) to the first position to release the engagement of the first fitting hook 411 with the engaging groove 21, such that the expanded element 20 can move longitudinally from top to bottom (the direction shown by arrow B) to be out of the first accommodating slot 121.

Figure 5A:
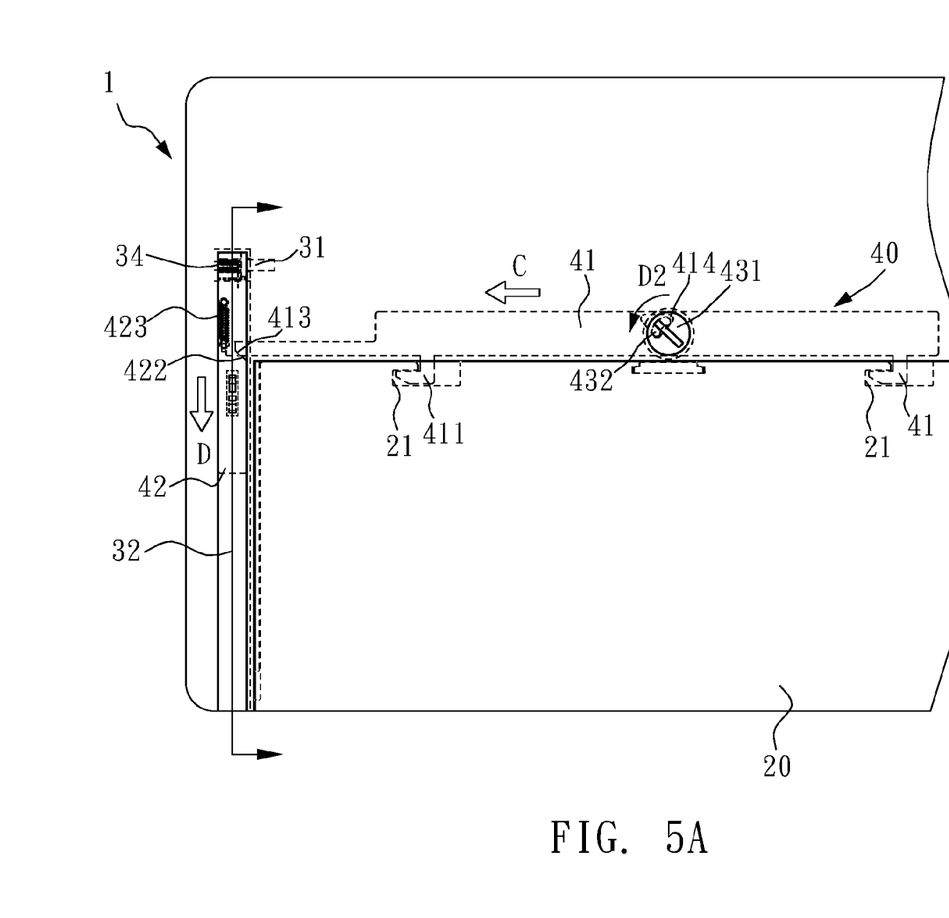
FIG. 5A is a view showing the portable electronic device withdrawing from a second expanded element according to an embodiment of the invention.
Figure 5B:
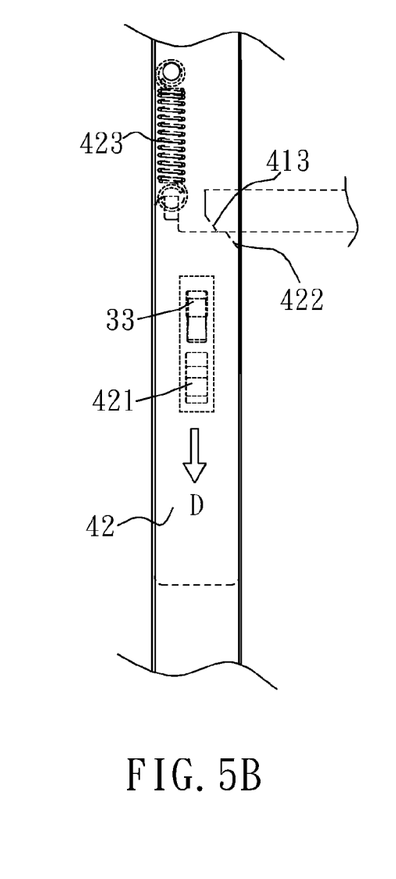
FIG. 5B is a view showing the interaction between an acting end and a contact incline.
Figure 6:
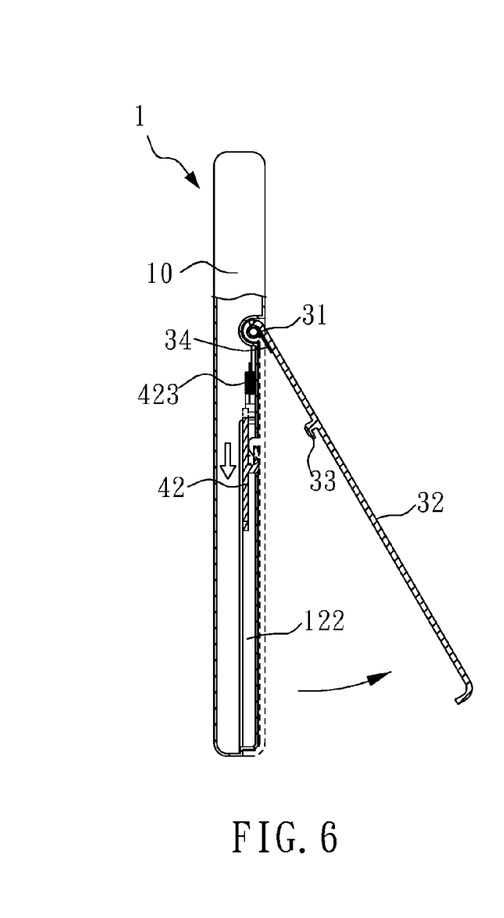
FIG. 6 is a lateral view of FIG. 5A.

Hereinafter please refer to FIGS. 5A, 5B, and 6, wherein FIG. 5A is a view showing the portable electronic device in an embodiment of the invention withdrawing from the second expanded element; FIG. 5B is a view showing the interaction between an acting end and a contact incline; and FIG. 6 is a lateral view of FIG. 5.

As shown in FIGS. 5A and 5B, in the present embodiment, when the roulette 432 is driven to move toward a second direction D2 (in a counterclockwise direction), the first latch element 41 is driven by the guide post 432 to move transversely from right to left (the direction shown by arrow C) to the second position. At this time, the acting end 413 of the latch device 40 pushes the contact incline 422 of the second latch element 42 and forces the second fitting hook 421 to move longitudinally from top to bottom along the arrows shown in FIGS. 5A and 5B (the direction shown by arrow D), such that the engagement of the third fitting hook 33 with the second fitting hook 421 is released. At this time, through the elasticity of the torsion spring 34, the support element 32 of the support device 30 is popped up, such that the support element 32 freely rotates with respect to the pivot 31 to be out of the second accommodating slot 122 as the state shown in FIG. 6, i.e. the support device 30 is in the support state with respect to the main body 10.

Please continue to refer to FIGS. 1 and 3 and also refer to FIG. 7, which is a view showing the using state of the portable electronic device according to the invention.

As shown in FIGS. 1 and 3, when the expanded element 20 and the support device 30 are folded in the first accommodating slot 121 and the second accommodating slot 122 respectively, the portable electronic device 1 of the invention can be used as a tablet computer. As shown in FIG. 7, when the expanded element 20 (keyboard module in this embodiment) and the support element 32 of the support device 30 withdraw from the first accommodating slot 121 and the second accommodating slot 122 respectively, the keyboard module can be completely separated with the main body 10 and communicated with the signal of the main body 10 of the invention through the wireless transmission module. At this time, the keyboard module can be placed on the plane in front of the main body 10 for text input operation. The support device 30 can be rotated outward to the support state to support the main body 10 for the user to view or perform touch operations.

Figure 8:
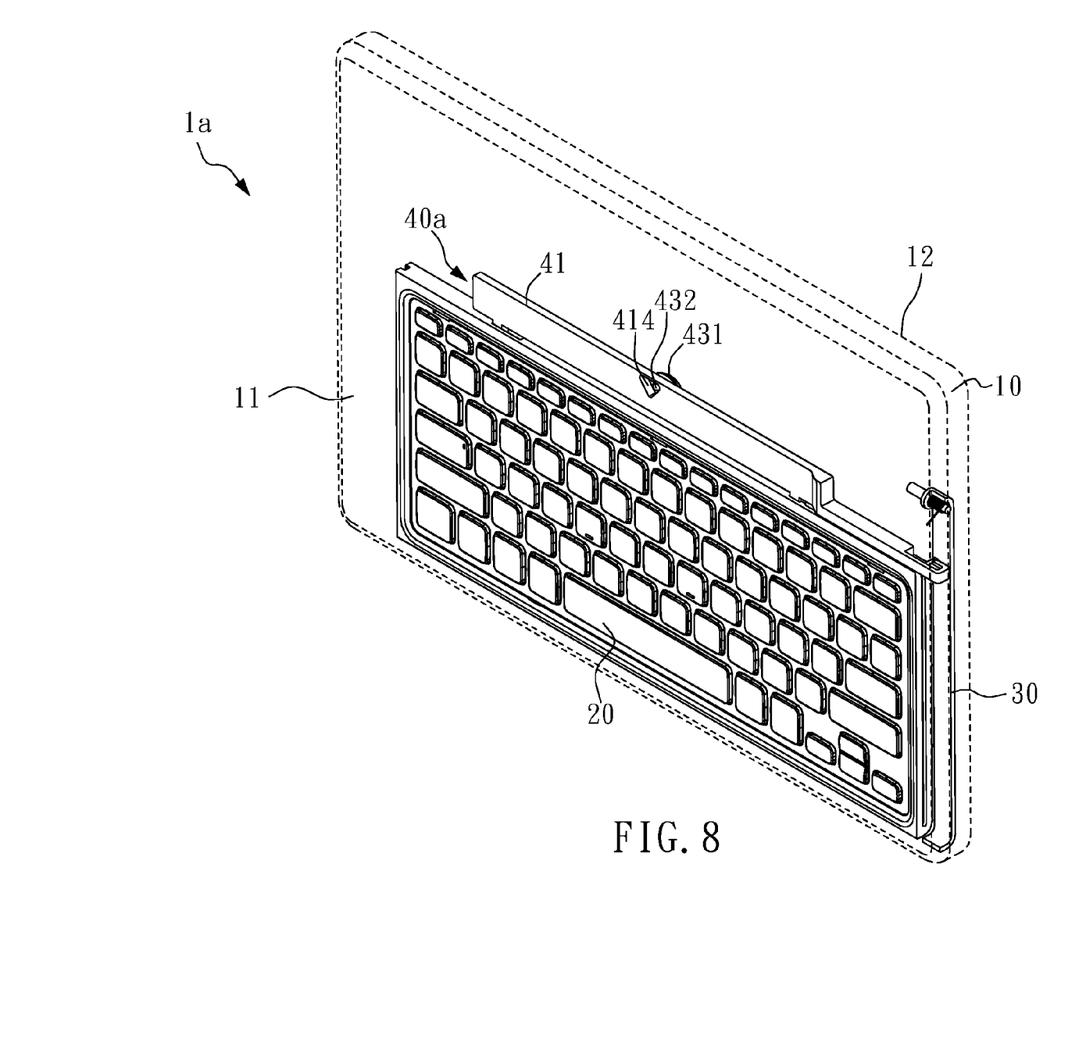
FIG. 8 is a view showing the portable electronic device according to another embodiment of the invention.
Figure 9:
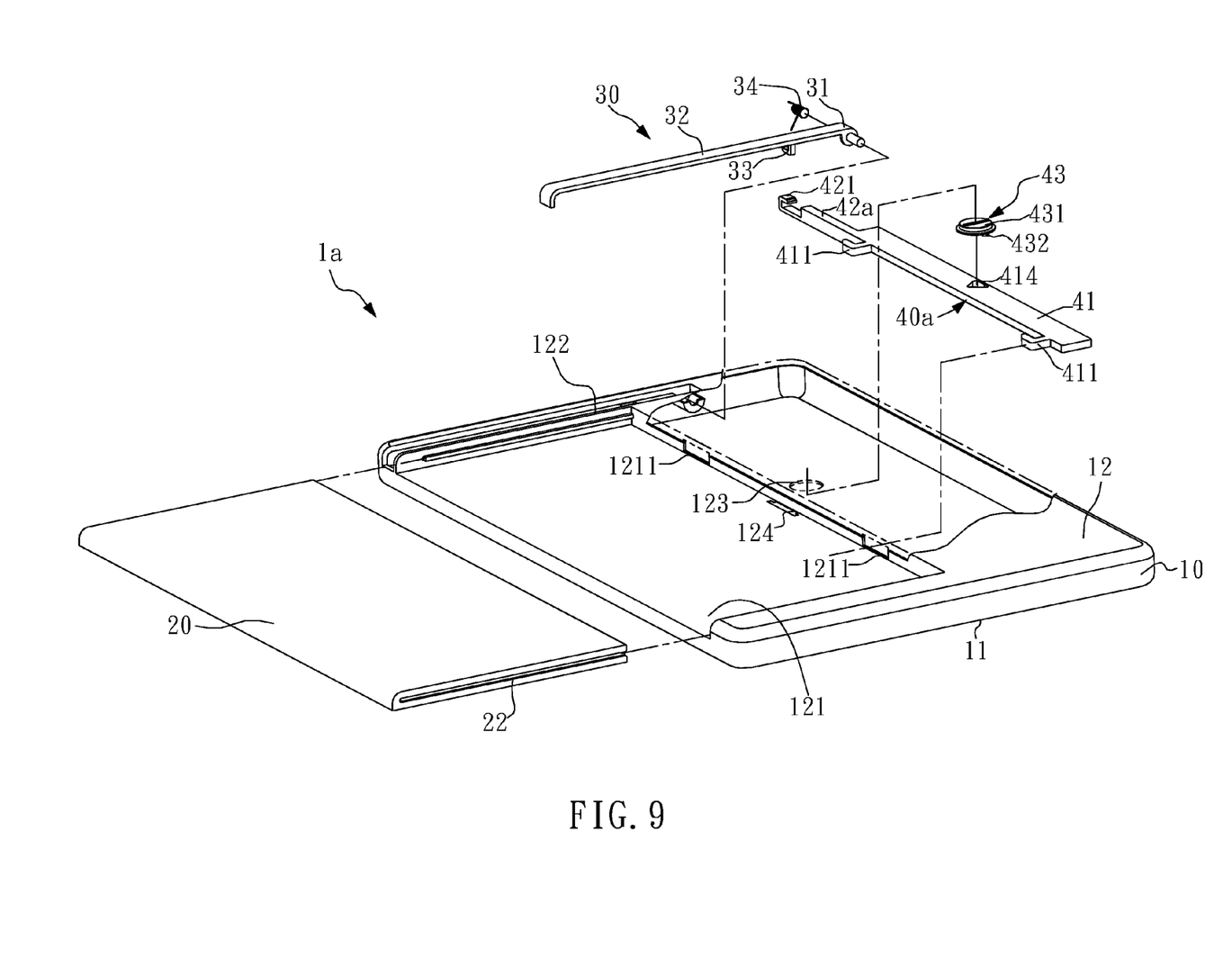
FIG. 9 is an exploded view showing the structure of the portable electronic device according to another embodiment of the invention.

Hereinafter please refer to FIGS. 8 to 9 with regard to the portable electronic device in another embodiment of the invention, wherein FIG. 8 is a view showing the portable electronic device according to another embodiment of the invention; FIG. 9 is an exploded view showing the structure of the portable electronic device according to another embodiment of the invention.

As shown in FIGS. 8 and 9, the biggest difference between the portable electronic device 1a and the portable electronic device 1 is: in the portable electronic device 1a according to the present embodiment, the second latch element 42a and the first latch element 41 in the latch device 40a are formed integrally, while the second fitting hook 421 is formed in one end of the second latch element 42a and directly engaged with the third fitting hook 33 of the support device 30.

Figure 10:
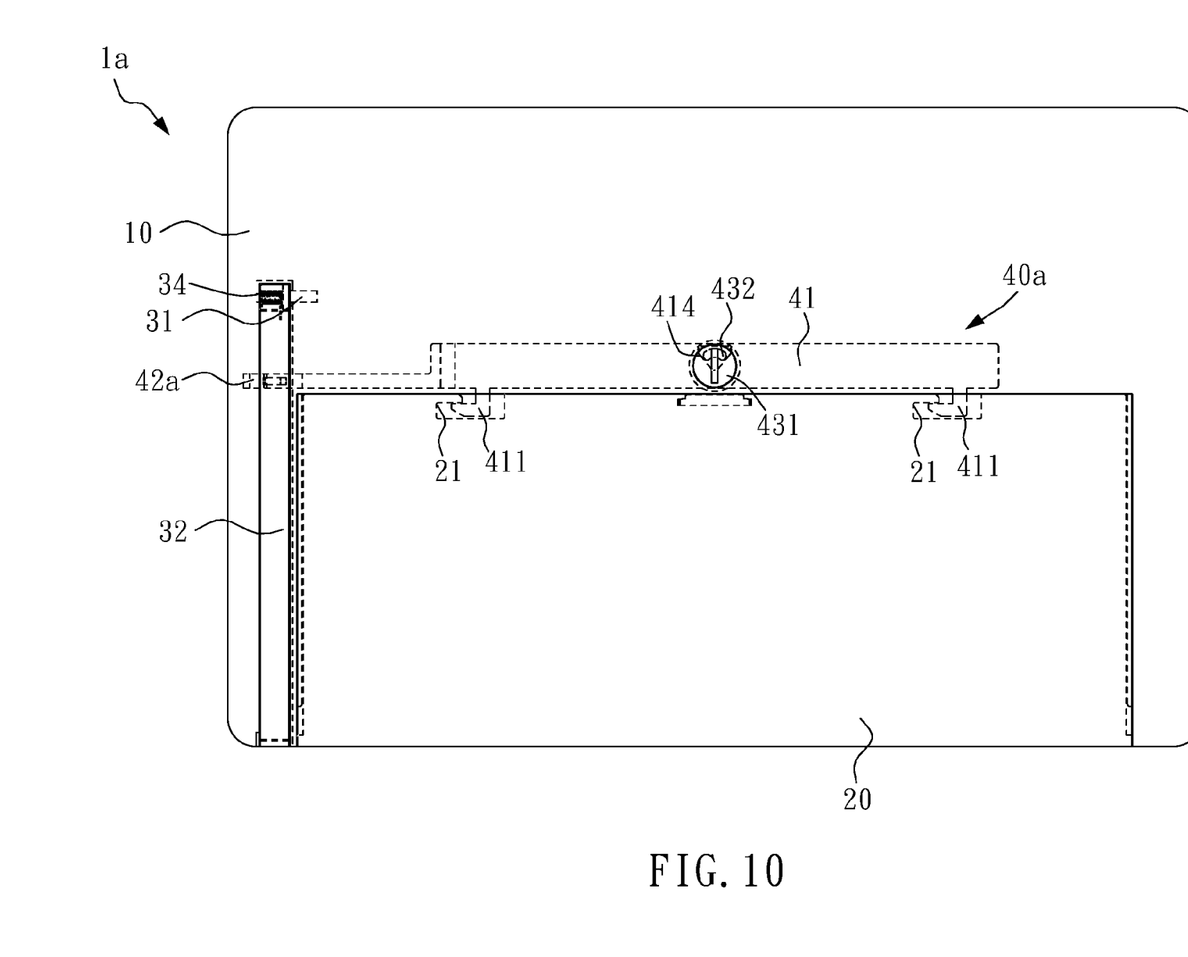
FIG. 10 is a view showing the second surface of the portable electronic device according to another embodiment of the invention.
Figure 11:
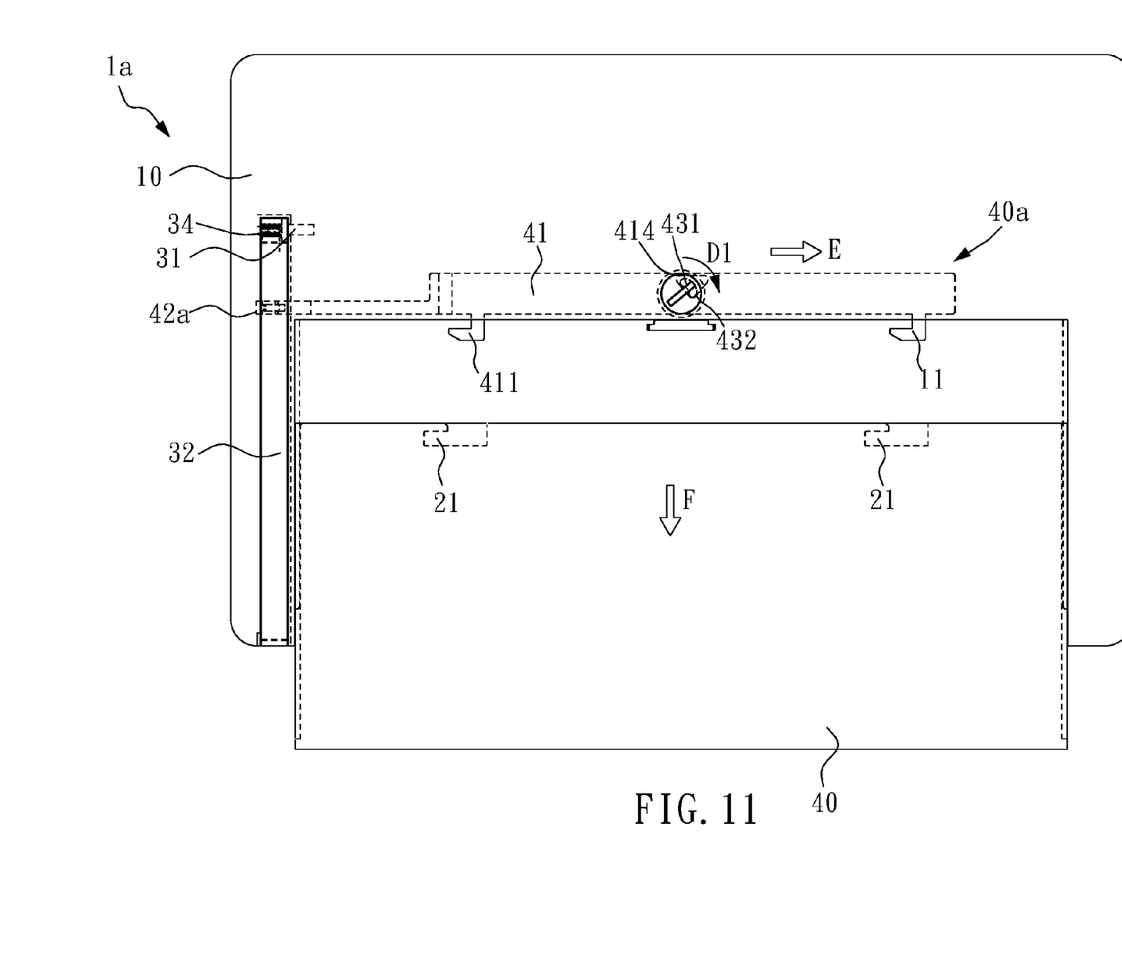
FIG. 11 is a view showing the portable electronic device withdrawing from the first expanded element according to another embodiment of the invention.

Hereinafter please refer to FIGS. 10 to 11, wherein FIG. 10 is a view showing a second surface of the portable electronic device according to another embodiment of the invention; and FIG. 11 is a view showing the portable electronic device withdrawing from the first expanded element according to another embodiment of the invention.

As shown in FIG. 10, when the expanded element 20 and the support device 30 are folded in first accommodating slot 121 and the second accommodating slot 122 respectively, and the expanded element 20 and the support device 30 are fixed by the first fitting hook 411 and the second fitting hook 421 respectively, the portable electronic device 1a is used as a tablet computer. Similar to the above-mentioned embodiment, as shown in FIG. 11, when the roulette 432 moves in the first direction D1 (in a clockwise direction), the first latch element 41 is driven by the guide post 432 to move transversely from left to right (the direction shown by arrow E) to the first position to release the engagement of the first fitting hook 411 with the engaging groove 21, such that the expanded element 20 can be out of the first accommodating slot 121 in a direction from top to bottom as shown in FIG. 11 (the direction shown by arrow F).

Figures 12, 13, 14:
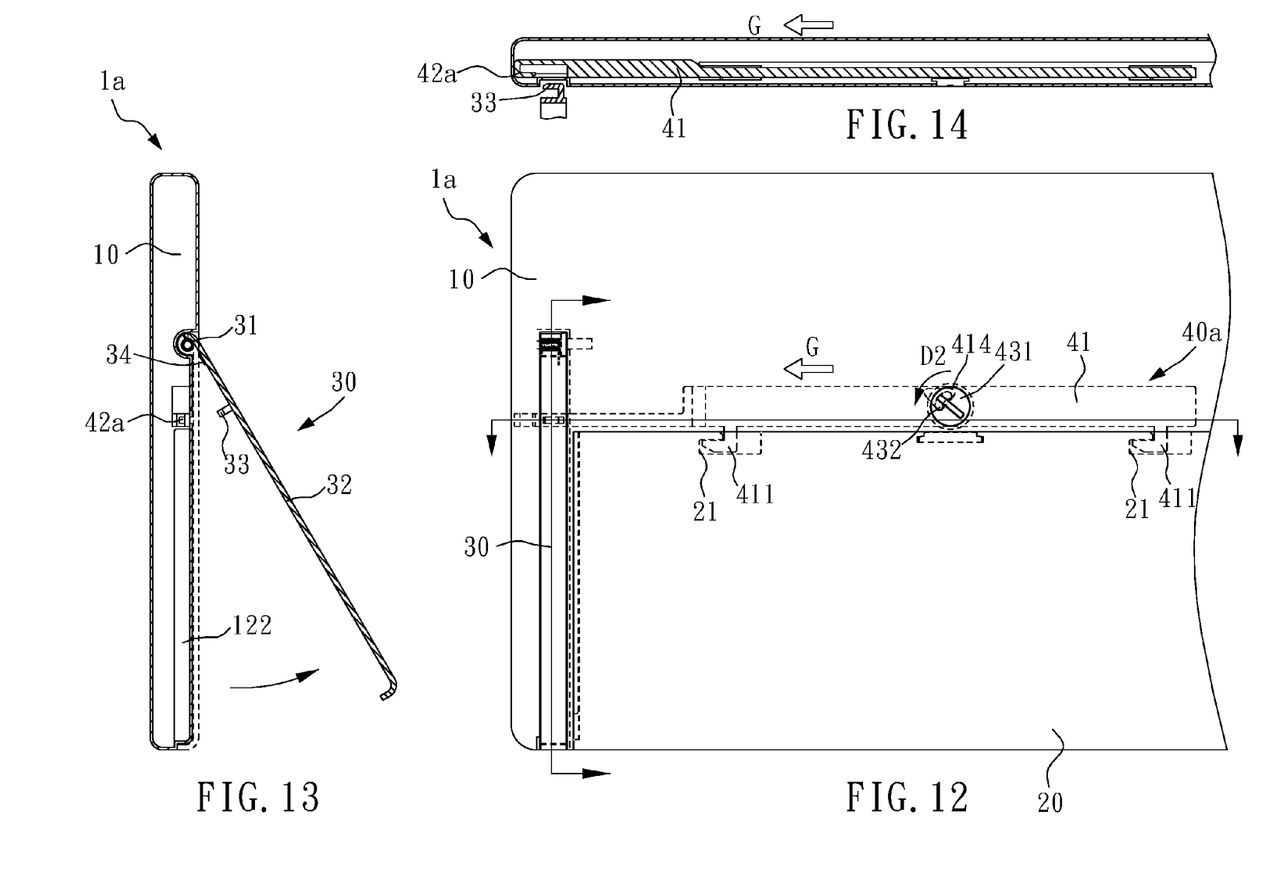
FIG. 12 is a view showing the portable electronic device withdrawing from the second expanded element according to another embodiment of the invention.
FIG. 13 is a lateral view of FIG. 12.
FIG. 14 is another lateral view of FIG. 12.

Hereinafter please refer to FIGS. 12 to 14, wherein FIG. 12 is a view showing the portable electronic device in another embodiment of the invention withdrawing from the second expanded element; FIG. 13 is a lateral view of FIG. 12; and FIG. 14 is another lateral view of FIG. 12.

As shown in FIG. 12, when the roulette 432 of the driving element 43 is driven to move toward a second direction D2 (in a counterclockwise direction), the first latch element 41 is driven by the guide post 432 to move transversely from right to left (the direction shown by arrow G) to a second position to release the engagement of the second fitting hook 421 with the third fitting hook 33. As shown in FIGS. 13 and 14, through the elasticity of the torsion spring 34, the support element 32 of the support device 30 can freely rotate with respect to the pivot 31 to be out of the second accommodating slot 122.

Comparing with the prior art, the portable electronic device 1 or 1a according to the invention is to use a single latch device 40 to control the engagement and disengagement of the expanded element 20 and the support device 30. Accordingly, the user only needs to selectively control the latch device 40 in the opposite direction to withdraw the expanded element 20 or the support device 30 selectively, which makes it more convenient to use. Furthermore, using a single latch device 40 to control the engagement and disengagement of the expanded element 20 and the support device 30 reduces the complexity of the overall structure of the portable electronic device 1 or 1a in the invention and achieves the support effect through fixing the support device.

Particularly, the expanded element 20 in a preferred embodiment of the invention can be integrated with a keyboard and a second battery. Accordingly, when the portable electronic device 1 is used as a tablet computer, the expanded element 20 can be accommodated in the first accommodating slot 121 to provide additionally expanded power supply. Alternatively, when it is not necessary to reserve a keyboard and a second battery, the expanded element 20 can even be taken out to reduce the weight of the portable electronic device 1. No matter whether the expanded element 20 is taken out, the user can rotate the support device 30 out to be used as a support stand of the main body 10, such that the portable electronic device 1 is used like an oblique tablet computer. If the support device 30 is folded and accommodated in the second accommodating slot 122, the portable electronic device 1 can be used as a handheld tablet computer. Also, the expanded element 20 can be taken out and put in front of the main body 10 as mentioned above to provide the keyboard capability such that the portable electronic device can be used similar to a notebook computer.

As described above, the objectives, means, and effectiveness in the present invention are different to the characteristics in the prior art, and thus a patent shall be granted. It should be noted that the embodiments described above are for illustrating the principles and effects of the present invention, not for limiting the scope of the present invention. Any person skilled in the art shall be able to make modifications and changes to the embodiments without departing from the technical principle and sprit of the present invention. The claims of the present invention within the scope of protection are described below.

What is claimed is:

1. A portable electronic device, comprising:
   a main body, comprising:
      a first surface having a display screen;
      a second surface opposite to the first surface, comprising a first accommodating slot and a second accommodating slot;
   an expanded element, which is detachably accommodated in the first accommodating slot and has at least one expanded function;
   a support device, which is accommodated in the second accommodating slot and movable with respect to the main body in an accommodating state or in a support state;
   a latch device movably disposed in the main body and comprising:
      a first latch element for engaging with the expanded element; and
      a second latch element for engaging with the support device, wherein when the latch device moves to a first position, the engagement of the first latch element with the expanded element is released; when the latch device moves to a second position, the engagement of the second latch element with the support device is released, such that the support device is moved and changed from the accommodating state to the support state in support of the main body.

2. The portable electronic device as claimed in claim 1, wherein when the latch device moves to the first position and the engagement of the first latch element with the expanded element is released, the expanded element is separated with respect to the main body.

3. The portable electronic device as claimed in claim 1, wherein when the latch device moves to the second position and the engagement of the second latch element with the support device is released, the support device is moved and changed from the accommodating state to the support state.

4. The portable electronic device as claimed in claim 1, wherein the main body has a first battery, and the expanded function of the expanded element comprises one of a keyboard and a second battery or both.

5. The portable electronic device as claimed in claim 1, wherein the expanded element comprises an engaging groove, and the first latch element comprises a first fitting hook correspondingly engaged with the engaging groove, wherein when the first latch element of the latch device moves to the first position, the engagement of the first fitting hook with the engaging groove is released, such that the expanded element is separated with respect to the main body.

6. The portable electronic device as claimed in claim 5, wherein the latch device further comprises a driving element disposed in the first latch element and exposed to the main body; the driving element being moved together with the first latch element which is moved to the first position and the second position through driving the driving element.

7. The portable electronic device as claimed in claim 6, wherein the first latch element comprises a groove and the driving element comprises a roulette and a guide post; the roulette being exposed to the main body and the guide post being disposed in the groove under the roulette; when the roulette being driven to move toward a first direction, the first latch element being driven by the guide post to move to the first position and the engagement of the first fitting hook with the engaging groove being released, and the expanded element being separated with respect to the main body.

8. The portable electronic device as claimed in claim 6, wherein the first latch element comprises an acting end and a contact incline disposed in the second latch element corresponding to the acting end; when the roulette being driven to move toward to a second direction, the first latch element being driven by the guide post to move to the second position, and the acting end pushing the contact incline to move the second latch element to release the engagement of the second latch element with the support device, such that the support device being in the support state.

9. The portable electronic device as claimed in claim 8, wherein the first latch element comprises a groove and the driving element comprises a roulette and a guide post; the roulette being exposed to the main body and the guide post being disposed in the groove under the roulette; when the driving element being driven to move toward a second direction, the first latch element being driven by the guide post to move to the second position to release the engagement of the second latch element with the support device, such that the support device being in the support state.

10. The portable electronic device as claimed in claim 1, wherein the second latch element comprises a second fitting hook and the support device comprises a third fitting hook; when the support device being in the accommodating state with respect to the main body, the second fitting hook being engaged with the third fitting hook.

11. The portable electronic device as claimed in claim 10, wherein the second latch element further has an elastic element with elasticity by which the second latch element normally maintains in a position where the second fitting hook is engaged with the third fitting hook.

12. The portable electronic device as claimed in claim 10, wherein the support device comprises a pivot, a support element, and a torsion spring, wherein the pivot being disposed in one end of the support element and the torsion spring being sleeved on the pivot; when the first latch element moving to the second position, the engagement of the second fitting hook with the third fitting hook being released, and the opposite end of the support element being out of the second accommodating slot through the elasticity of the torsion spring.

13. The portable electronic device as claimed in claim 1, wherein the first latch element and the second latch element are formed integrally.

* * * * *